US012394176B2

United States Patent
Luo et al.

(10) Patent No.: US 12,394,176 B2
(45) Date of Patent: Aug. 19, 2025

(54) METHOD AND APPARATUS FOR OPTIMIZING HDR VIDEO DISPLAY PROCESSING, AND STORAGE MEDIUM AND TERMINAL

(71) Applicant: SPREADTRUM COMMUNICATIONS (SHANGHAI) CO., LTD., Shanghai (CN)

(72) Inventors: Xiaowei Luo, Shanghai (CN); Jiali Shen, Shanghai (CN); Guangyao Li, Shanghai (CN); Qingqing Zhao, Pudong New Area Shanghai (CN); Fuhuei Lin, Shanghai (CN); Xiaofeng Peng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 368 days.

(21) Appl. No.: 18/023,266

(22) PCT Filed: Aug. 10, 2021

(86) PCT No.: PCT/CN2021/111657
§ 371 (c)(1),
(2) Date: Feb. 24, 2023

(87) PCT Pub. No.: WO2022/042286
PCT Pub. Date: Mar. 3, 2022

(65) Prior Publication Data
US 2023/0298305 A1  Sep. 21, 2023

(30) Foreign Application Priority Data
Aug. 26, 2020 (CN) .......................... 202010872651.5

(51) Int. Cl.
*G06V 10/60* (2022.01)
*G06T 5/92* (2024.01)
(Continued)

(52) U.S. Cl.
CPC ................ *G06V 10/60* (2022.01); *G06T 5/92* (2024.01); *G09G 3/006* (2013.01);
(Continued)

(58) Field of Classification Search
None
See application file for complete search history.

(56) References Cited

U.S. PATENT DOCUMENTS 10,963,998 B1  3/2021 Baar et al.
2013/0057721 A1  3/2013 Shmueli et al.
(Continued)

FOREIGN PATENT DOCUMENTS

CN  105393525 A  3/2016
CN  105869112 A  8/2016
(Continued)

OTHER PUBLICATIONS

International Search Report for International Application No. PCT/CN2021/111657; Mailing Date, Nov. 9, 2021.
(Continued)

*Primary Examiner* — Darryl V Dottin
(74) *Attorney, Agent, or Firm* — CANTOR COLBURN LLP (57) ABSTRACT

A method for optimizing HDR video display processing, comprises: acquiring original video stream data; decoding the original video stream data to obtain metadata and image frame data of each image frame; in an m-th iteration, for each image frame, according to a characteristic parameter of a target display panel and the metadata, performing HDR processing on the image frame data by using an HDR video
(Continued)

display processing algorithm, to obtain the image frame data subjected to HDR processing and corresponds to the original video stream data in the m-th iteration; and according to a playing display detection result, on the target display panel, of the image frame data that has been subjected to HDR processing and is obtained in the m-th iteration, optimizing an algorithm used in an (m+1)th iteration until the optimization of the HDR video display processing algorithm is completed.

20 Claims, 3 Drawing Sheets

(51) Int. Cl.
  *G09G 3/00* (2006.01)
  *H04N 19/186* (2014.01)
  *H04N 19/44* (2014.01)
  *H04N 19/59* (2014.01)
(52) U.S. Cl.
  CPC ........... *H04N 19/186* (2014.11); *H04N 19/44* (2014.11); *H04N 19/59* (2014.11); *G06T 2207/20208* (2013.01)

(56) References Cited

U.S. PATENT DOCUMENTS

| | | | |
|---|---|---|---|
| 2014/0044372 A1* | 2/2014 | Mertens | G06T 9/007 382/248 |
| 2015/0117791 A1* | 4/2015 | Mertens | H04N 19/102 382/239 |
| 2015/0243200 A1 | 8/2015 | Pan | |
| 2016/0021391 A1 | 1/2016 | Su et al. | |
| 2016/0165256 A1 | 6/2016 | Van Der Vleuten et al. | |
| 2017/0134745 A1 | 5/2017 | Boitard et al. | |
| 2018/0082661 A1 | 3/2018 | Kang et al. | |
| 2018/0324481 A1 | 11/2018 | Bordes et al. | |
| 2018/0336669 A1* | 11/2018 | Mertens | H04N 5/445 |
| 2019/0068969 A1 | 2/2019 | Rusanovskyy et al. | |
| 2019/0124368 A1 | 4/2019 | Francois et al. | |
| 2020/0120345 A1 | 4/2020 | Guo et al. | |
| 2020/0193890 A1 | 6/2020 | Tichelaar et al. | |
| 2020/0394775 A1 | 12/2020 | Andrivon et al. | |
| 2021/0076042 A1 | 3/2021 | Choudhury et al. | |
| 2021/0150812 A1 | 5/2021 | Su et al. | |

FOREIGN PATENT DOCUMENTS

| | | |
|---|---|---|
| CN | 106537911 A | 3/2017 |
| CN | 107872662 A | 4/2018 |
| CN | 108370455 A | 8/2018 |
| CN | 108769804 A | 11/2018 |
| CN | 109410126 A | 3/2019 |
| CN | 109587560 A | 4/2019 |
| CN | 110365974 A | 10/2019 |
| CN | 110612550 A | 12/2019 |
| CN | 110855890 A | 2/2020 |
| CN | 110867172 A | 3/2020 |
| CN | 111031346 A | 4/2020 |
| CN | 111095931 A | 5/2020 |
| CN | 111246050 A | 6/2020 |
| CN | 111316625 A | 6/2020 |
| CN | 111970564 A | 11/2020 |
| CN | 112204617 A | 1/2021 |
| WO | 2020092025 A1 | 5/2020 |

OTHER PUBLICATIONS

Jingyu Fang, "Study on Methodology and Technology of Acquisition and Rendering for High Dynamic Range Color Images", Sep. 13, 2016, 164 pages.

Liu et al., "A multi-modeling electro-optical transfer function for display and transmission of high dynamic range content", IEEE Transactions on Consumer Electronics, vol. 63, No. 4, Nov. 2017, 9 pages.

Zhang Chun, "Research on the High Dynamic Range Imaging and Display Technology Based on SoC"; A thesis submitted to Xidian University; Jun. 2017, 94 pages.

* cited by examiner

METHOD AND APPARATUS FOR OPTIMIZING HDR VIDEO DISPLAY PROCESSING, AND STORAGE MEDIUM AND TERMINAL

CROSS REFERENCE TO RELATED APPLICATIONS

This is the U.S. national stage of application No. PCT/CN2021/111657, filed on Aug. 10, 2021. Priority under 35 U.S.C. § 119(a) and 35 U.S.C. § 365(b) is claimed from Chinese Application No. 202010872651.5, filed Aug. 26, 2020, the disclosure of which is also incorporated herein by reference.

FIELD

The present disclosure relates to the field of display processing of HDR videos, in particular to a method and device for optimizing display processing of an HDR video, a non-transitory storage medium and a terminal.

BACKGROUND

With the promotion of advanced technology and the upgrading of electronic consumption, high-dynamic-range (HDR) videos are widely welcomed since being launched due to amazing experience. Due to outstanding highlights of the HDR videos, not only TV manufacturers but also manufacturers of mobile devices such as smartphones and tablets integrate HDR video processing technology in new generation products. Radio, television, and online video websites launch HDR video contents too. Multiple standards are developed during the development process of the HDR videos, and the standards include HDR10, Dolby Vision, HDR10+, HLG, Advanced HDR by Technicolor, and DisplayHDR. To be acceptable to more users in the market, the product of a device manufacturer has to be compatible with multiple standards, which increases the complexity and the development cycle of the product.

In order to ensure the smoothness of playback and display of the HDR video, decoding processing and display adaptation (including gamut conversion and tone mapping) are performed on the HDR video through a hardware accelerator in a system on chip (SOC). The development and effect of an algorithm corresponding to the hardware accelerator are required to be fully verified.

During an early design stage of the hardware accelerator, usually some decoded image frames are extracted from the HDR video, and a display processing algorithm for the HDR video is verified by using single image frame; and during a later design stage of the hardware accelerator, in a field programmable logic array (FPGA) and other environment, the image frames of the HDR video are sequentially transmitted to the hardware accelerator on the FPGA by means of a decoder such as external set-top box, to review the effect of the display processing algorithm for the HDR video on a display panel.

The HDR video has numerous test cases each including numerous image frames (mostly more than 2000 frames), with each frame (in resolution of at least 4K) occupying a large data volume. The FPGA has a limited processing speed and may only process 1 to 2 frames of images per second. Once a problem in the display processing algorithm is found, it is required to trace a source of the problem. After the display processing algorithm for the HDR video and the hardware accelerator are modified, it is required to re-verify the effect of the display processing algorithm for the HDR video. The above process is repeated for iterative development. Therefore, verification of the effect of the display processing algorithm for the HDR video is very time-consuming and inefficient.

SUMMARY

The present disclosure aims to solve the technical problem of time-consuming and inefficient verification of the effect of the display processing algorithm for the HDR video.

To solve the technical problem above, a method for optimizing display processing of an HDR video is provided according to embodiments of the present disclosure. The method includes: extracting video element stream data from an HDR test video; decoding the video element stream data to acquire metadata and image frame data of each image frame, where the metadata includes gamut information and brightness information; in an m-th iteration of display processing of the HDR video, performing HDR processing on image frame data of each image frame with a display processing algorithm for the HDR video according to a characteristic parameter of a target display panel and the metadata, to acquire HDR-processed image frame data in the m-th iteration; and optimizing the display processing algorithm for the HDR video for usage in an (m+1)-th iteration based on a playback result of the HDR-processed image frame data, acquired in the m-th iteration, on the target display panel; and completing the optimization of the display processing algorithm for the HDR video in the HDR processing once the playback result of HDR-processed image frame data, acquired in an (m+i)-th iteration, on the target display panel meets a predetermined condition, where $m \geq 1$, $i \geq 0$, and m and i each represent an integer.

A device for optimizing display processing of an HDR video is further provided according to the embodiments of the present disclosure. The device includes: an acquisition unit, configured to acquire video element stream data; a decoding unit, configured to decode the video element stream data to acquire metadata and image frame data of each image frame, where the metadata includes gamut information and brightness information; a HDR processing unit, configured to perform, in an m-th iteration of display processing of the HDR video, HDR processing on image frame data of each image frame with a display processing algorithm for the HDR video according to a characteristic parameter of a target display panel and the metadata, to acquire HDR-processed image frame data, corresponding to the video element stream data and acquired in the m-th iteration; and an optimization unit, configured to optimize the display processing algorithm for the HDR video for usage in an (m+1)-th iteration based on a playback result of the HDR-processed image frame data, corresponding to the video element stream data and acquired in the m-th iteration, on the target display panel; and complete optimization of the display processing algorithm for the HDR video in the HDR processing once the playback result of HDR-processed image frame data, corresponding to the video element stream data and acquired in an (m+i)-th iteration, on the target display panel meets a predetermined condition, where $m \geq 1$, $i \geq 0$, and m and i each represent an integer.

A non-transitory storage medium is further provided according to the embodiments of the present disclosure. The non-transitory storage medium stores a computer program. The computer program is used to, when being executed by a processor, perform any one of the methods for optimizing display processing of an HDR video described above.

A terminal is further provided according to the embodiments of the present disclosure. The terminal includes a memory and a processor. The memory is configured to store a computer program executable by the processor. The processor is configured to, when executing the computer program, perform any one of the methods for optimizing display processing of an HDR video described above.

DETAILED DESCRIPTION

As described above, in order to ensure the smoothness of playback and display of an HDR video, decoding processing and display adaptation (including gamut conversion and tone mapping) are performed on the HDR video through a hardware accelerator in the SOC. The development and an effect of an algorithm corresponding to the hardware accelerator are required to be fully verified.

During an early design stage of the hardware accelerator, usually some decoded image frames are extracted from the HDR video, and a display processing algorithm for the HDR video is verified by using single image frame; and during a later design stage of the hardware accelerator, in a field programmable logic array (FPGA) and other environment, the image frames of the HDR video are sequentially transmitted to the hardware accelerator on the FPGA by means of a decoder such as external set-top box, to review the effect of the display processing algorithm for the HDR video on a display panel.

The HDR video is a system that requires the coordination of decoding and display processing of the video, which brings great coupling between the development and verification of the display processing algorithm for the HDR video. Currently, the decoding and display processing of the HDR video are performed separately from each other without considering the coupling between the decoding and the display processing of the HDR video on a system link. Therefore, the display processing algorithm for the HDR video is prone to encounter problem during a design process of the hardware accelerator. Once the problem in the display processing algorithm for the HDR video is found, it is required to trace a source of the problem. After the display processing algorithm for the HDR video and the hardware accelerator are modified, it is required to re-verify the effect of the display processing algorithm for the HDR video. The above process is repeated for iterative development. The HDR video has numerous test cases each including numerous image frames (mostly more than 2000 frames), with each frame (in resolution of at least 4K) occupying a large data volume. The FPGA has a limited processing speed and may only process 1 to 2 frames of images per second. Therefore, the verification of the effect of the display processing algorithm for the HDR video is very time-consuming and inefficient.

According to an embodiment of the present disclosure, a decoding process of the HDR video is coupled in the development of the display processing algorithm for the HDR video. Based on metadata and data of each image frame acquired by decoding the HDR video, in an m-th iteration of the display processing of the HDR video, HDR processing is performed on image frame data of each image frame with the display processing algorithm for the HDR video according to characteristic parameters of a target display panel and the metadata, to acquire HDR-processed image frame data corresponding to video element stream data in the m-th iteration. The display processing algorithm for the HDR video for usage in the m-th iteration is optimized based on a playback result of HDR-processed image frame data acquired in the (m−1)-th iteration on the target display panel. The display processing algorithm for the HDR video for usage in an (m+1)-th iteration is optimized based on a playback result of HDR-processed image frame data acquired in the m-th iteration on the target display panel, where the HDR-processed image frame data corresponds to the video element stream data. This repeats until the optimization of the display processing algorithm for the HDR video in the HDR processing is completed. During the development process of the display processing algorithm for the HDR video, the coupling between the decoding and the display processing of the HDR video on the system link is fully considered to achieve the coordination of the decoding and the display processing of the HDR video, so that a problem may be exposed in advance and the display processing algorithm for the HDR video is optimized during the development process of the display processing algorithm for the HDR video. The display processing algorithm for the HDR video optimized during the development process may match with a HDR video decoding module. Compared with the technology in which the effect of the display processing algorithm for the HDR video is verified by transmitting image frames from a decoder such as external set-top box to the hardware accelerator on the FPGA during the design process of the hardware accelerator in the FPGA environment, the present disclosure can improve the efficiency of verifying the effect of the display processing algorithm for the HDR video, and shorten a development cycle of the display processing algorithm for the HDR video.

For better understanding of the above objectives, features and beneficial effects of the embodiments of the present disclosure, the specific embodiments of the present disclosure are described in detail below with reference to the drawings.

Figure 1:
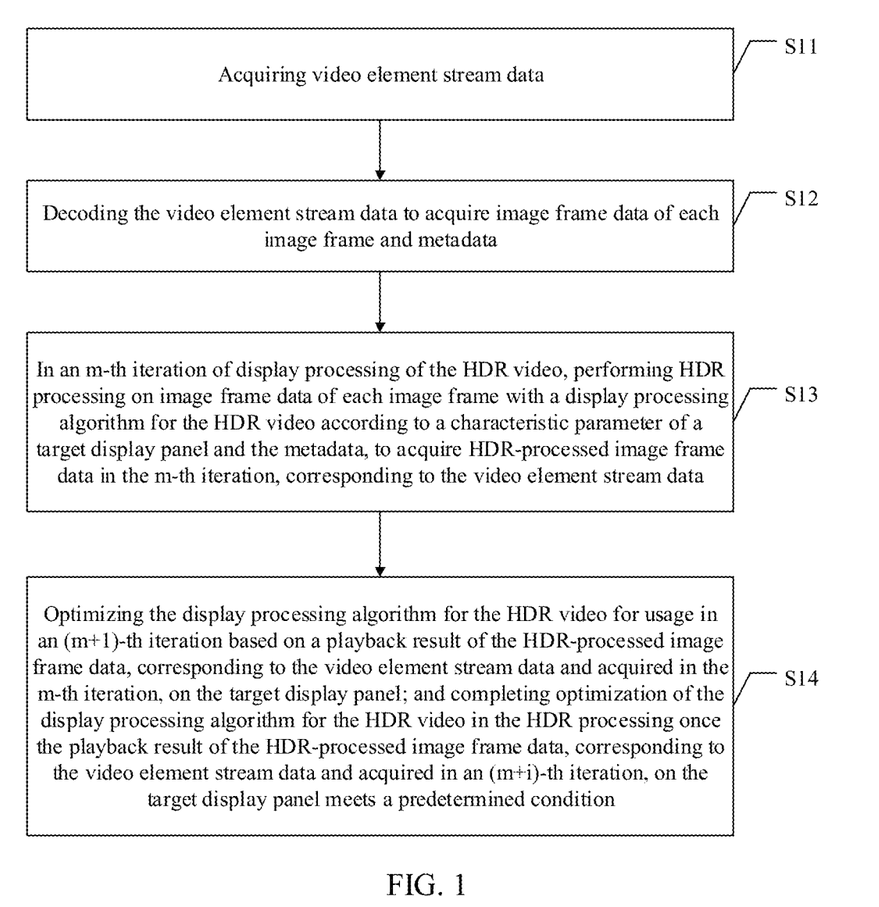
FIG. 1 shows a flow chart of a method for optimizing display processing of an HDR video according to an embodiment of the present disclosure.

Reference is made to FIG. 1, which is a flow chart of a method for optimizing display processing of an HDR video according to an embodiment of the present disclosure. The method may include the following S11 to S14.

In S11, video element stream data is acquired.

In an embodiment, the video element stream (ES) data may be acquired from multiple sources.

In an embodiment of the present disclosure, the video element stream data may be extracted from an HDR test video. For example, audio and video extraction are performed on the HDR test video by using a tool with an extraction function such as FFMPEG, to extract the video ES data from the HDR test video.

In another embodiment of the present disclosure, the video element stream data may be acquired from a stream inputted by a high-definition multimedia interface (HDMI).

It can be understood that the video element stream data may be acquired from other sources, such as pre-stored video element stream data, which is not expatiated herein.

In S12, the video element stream data is decoded to acquire metadata and image frame data of each image frame.

In an embodiment, the video ES data is a video sequence formed by multiple image frames. The video ES data may be decoded by using a video decoder with a decoding function, such as HEVC or VP9 decoder, to acquire the image frame data of each image frame. The image frame data is YUV data. For example, the image frame data equals to 10 bit of YUV data. That is, a video in a format of mp4 and the like may be converted into pure YUV data by decoding the video ES data.

In an embodiment, the video ES data is decoded, to extract the metadata from the video ES data. A form of the metadata is related to a standard corresponding to the video ES data. The metadata may correspond to the video ES data or correspond to the image frames. In a case that the metadata corresponds to the image frames, the image frames and the metadata may be in one-to-one correspondence, or multiple consecutive image frames may correspond to the same metadata.

The metadata may include gamut information and brightness information.

The gamut information may include a color management standard such as DCI-P3 or BT.2020.

The brightness information may include a maximum content light level (MaxCLL). The MaxCLL indicates a brightness of a brightest pixel in the HDR video. The brightness information may further include a maximum frame-average light level (MaxFALL). A frame-average brightness indicates an average brightness of all pixels in one image frame. The MaxFALL indicates a maximum average brightness among all image frames in the HDR video. It is understood that the brightness information may further include other information related to brightness.

In an embodiment, the metadata may further include: an electro-optical transfer function (EOTF) curve, and a type of the EOTF curve may include HLG, PQ, or the like.

In an embodiment, in a case that the HDR test video is in a standard of HDR10+, the metadata may further include a curve parameter of tone mapping.

In an embodiment, the metadata of the HDR video may be divided into static metadata and dynamic metadata.

In an embodiment, the dynamic metadata may include color remapping information (CRI) between image frames or between scenarios. The dynamic metadata transfers information related to a change of color and a change of brightness with time. Especially for the HDR video using the dynamic metadata such as HDR10+, modification of a display image and the dynamic metadata are required to be in a one-to-one correspondence for correct restoring.

In S13, in the m-th iteration of the display processing of the HDR video, HDR processing is performed on image frame data of each image frame with the display processing algorithm for the HDR video according to characteristic parameters of the target display panel and the metadata of the image frame, to acquire HDR-processed image frame data corresponding to the video element stream data in the m-th iteration.

In an embodiment, characteristic parameters of the target display panel may include brightness information of the target display panel, gamut information of the target display panel, and the like.

In a case that m equals to 1, the display processing algorithm for the HDR video for usage in the first iteration is an initial display processing algorithm for the HDR video.

In an embodiment, in a case that m is greater than 1, the display processing algorithm for the HDR video for usage in the m-th iteration is optimized based on a playback result of HDR-processed image frame data on the target display panel, where the HDR-processed image frame data corresponds to the video element stream data and is acquired in the (m−1)-th iteration.

In an embodiment, for each iteration, HDR processing is required to be performed on all image frames in the video ES data until the HDR processing is completed for the last image frame in the video ES data.

To facilitate understanding, the process of the HDR processing is described below by taking an n-th image frame as an example. During the HDR processing on the n-th image frame, the HDR processing is performed on the image frame data of the n-th image frame according to characteristic parameters of the target display panel, the gamut information and the brightness information related to the n-th image frame, to acquire HDR-processed image frame data corresponding to the n-th image frame.

Specifically, a brightness of the image frame data of the n-th image frame may be modified according to characteristic parameters of the target display panel and the brightness information of the n-th image frame. Gamut mapping may be performed on the image frame data of the n-th image frame according to characteristic parameters of the target display panel and the gamut information of the n-th image frame.

Specifically, the metadata includes the EOTF curve. The brightness of the image frame data of the n-th image frame is modified by using the EOTF curve according to brightness information in the target display panel and the brightness information of the n-th image frame.

In an embodiment, in a case that the HDR test video is in the standard of HDR10+, the metadata may further include a curve parameter of tone mapping.

In an embodiment, in a case that the metadata includes the curve parameter of tone mapping, tone mapping is performed on the image frame data of the n-th image frame according to characteristic parameters of the target display panel and the curve parameter of tone mapping of the n-th image frame.

In an embodiment, the performing the HDR processing on the n-th image frame based on the display processing algorithm for the HDR video may include at least one of: modifying the brightness of the image frame data of the n-th image frame by using the EOTF curve (also referred to as degamma); performing gamut mapping on the image frame data of the n-th image frame; performing tone mapping on the image frame data of the n-th image frame; and modifying the brightness of the image frame data of the n-th image frame by using an OETF curve (also referred to as regamma). It can be understood that, in practices, other types of the HDR processing may further be performed on the image frame data as required.

The HDR processing is sequentially performed on all image frames in the video ES data until the HDR processing is completed for the last image frame in the video ES data. The HDR processing of each of the image frames may be referred to the HDR processing of the n-th image frame, which is not repeated herein.

In S14, the display processing algorithm for the HDR video for usage in the (m+1)-th iteration is optimized based on the playback result of the HDR-processed image frame data, corresponding to the video element stream data and acquired in the m-th iteration, on the target display panel, until a playback result of HDR-processed image frame data acquired in an (m+i)-th iteration on the target display panel meets a predetermined condition.

In an embodiment, the HDR-processed image frame data corresponding to the video element stream data is acquired in the m-th iteration and then may be played through a video player on a computer or other terminal and displayed on the target display panel connected to the computer. Subsequently, the playback result of the HDR-processed image frame data, corresponding to the video element stream data and acquired in the m-th iteration, on the target display panel is utilized in optimizing the display processing algorithm for the HDR video for usage in the (m+1)-th iteration. Once the playback result of the HDR-processed image frame data, corresponding to the video element stream data and acquired in the (m+i)-th iteration, on the target display panel meets the predetermined condition, the optimization of the display processing algorithm for the HDR video in the HDR processing is completed, where m≥1, i≥0, and m and i each represent an integer.

In a case that the playback result of the HDR-processed image frame data, corresponding to the video element stream data and acquired in the m-th iteration, on the target display panel does not meet the predetermined condition, for example, in a case that there is a defect in the playback result on the target display panel, the display processing algorithm for the HDR video may be optimized according to the defect, the metadata and the image frame data, the optimized display processing algorithm for the HDR video serves as the display processing algorithm for the HDR video in the (m+1)-th iteration. The defect may include at least one of: an inter-frame brightness flicker, a local overexposure of image, under-saturation of image, and over-saturation of image.

In a case that the playback result of the HDR-processed image frame data, corresponding to the video element stream data and acquired in the m-th iteration, on the target display panel meets the predetermined condition, it is determined that optimization of the display processing algorithm for the HDR video is completed.

It can be seen from the above that a decoding process of the HDR video is coupled in the development of the display processing algorithm for the HDR video. Based on metadata and data of each image frame acquired by decoding the HDR video, in an m-th iteration of the display processing of the HDR video, HDR processing is performed on image frame data of each image frame with the display processing algorithm for the HDR video according to characteristic parameters of a target display panel and the metadata, to acquire HDR-processed image frame data, corresponding to video element stream data and acquired in the m-th iteration. The display processing algorithm for the HDR video for usage in the m-th iteration is optimized based on a playback result of HDR-processed image frame data, acquired in an (m−1)-th iteration, on the target display panel. The display processing algorithm for the HDR video for usage in an (m+1)-th iteration is optimized based on a playback result of HDR-processed image frame data, corresponding to the video element stream data and acquired in the m-th iteration, on the target display panel, until the optimization of the display processing algorithm for the HDR video for usage in the HDR processing is completed. It can be understood that, once the playback result of the HDR-processed image frame data, acquired in the m-th iteration, on the target display panel meets the predetermined condition, the optimization of the display processing algorithm for the HDR video is completed and subsequent iteration is omitted. During the development process of the display processing algorithm for the HDR video, the coupling between the decoding and the display processing of the HDR video on the system link is fully considered to achieve the coordination of the decoding and the display processing of the HDR video, so that a problem may be exposed in advance and the display processing algorithm for the HDR video is optimized during the development process of the display processing algorithm for the HDR video.

During the design process of the hardware accelerator, when a decoding module and a display module based on the display processing algorithm for the HDR video cooperate to process the HDR video, the display processing algorithm for the HDR video optimized during the development process matches with the decoding module. Hence mismatching between the display module and the decoding module will not occur on the hardware accelerator, to effectively avoid modifying the display processing algorithm for the HDR video and the hardware accelerator in a production process of the hardware accelerator. Therefore, compared with the technology in which the effect of the display processing algorithm for the HDR video is verified by transmitting image frames from a decoder such as external set-top box to the hardware accelerator on the FPGA during the design process of the hardware accelerator in the FPGA environment, the present disclosure can improve the efficiency of verifying the effect of the display processing algorithm for the HDR video, and shorten a development cycle of the display processing algorithm for the HDR video.

In addition, since the coupling between decoding and display of the HDR video is fully considered in the development of the display processing algorithm for the HDR video, after applying the display processing algorithm for the HDR video to the system on chip (SOC), an effect for the SOC to process the HDR video will be kept even in batch-produced SOC chips. Based on the method for optimizing display processing of an HDR video according to the embodiment of the present disclosure, the problem of mismatch between the decoding module and the display module in an integration process of the SOC can be effectively avoided, and workload and time cost of integration and verification of the system in later design stage of the chip can be lowered.

In order to facilitate the optimization of the display processing algorithm for the HDR video, in the embodiment of the present disclosure, after the HDR-processed image frame data corresponding to the video stream element data is acquired in the m-th iteration, the metadata and the HDR-processed image frame data may be stored, where the HDR-processed image frame data corresponds to the video stream element data and is acquired in the m-th iteration. In a case that the playback result of the HDR-processed image frame data, corresponding to the video element stream data and acquired in the m-th iteration, on the target display panel does not meet the predetermined condition and the optimization of the display processing algorithm for the HDR video needs to be continued, a defective image frame may be determined according to a defect of the playback result and a location of the defect. The image frame data and metadata corresponding to the defective image frame may be identified from the stored metadata and the stored HDR-processed image frame data of each image frame, corresponding to the video stream element data and acquired in the m-th iteration. This is conducive to the rapid determination of the defect and data related to the defect.

In an embodiment, in order to reduce a storage space occupied by the metadata and the HDR-processed image frame data, corresponding to the video stream element data and acquired in the m-th iteration, the HDR-processed image frame data may be reduced before being stored. In an embodiment, the HDR-processed image frame data may be reduced in multiple manners, which are described below.

In an embodiment of the present disclosure, for each image frame, the HDR-processed image frame data acquired in the m-th iteration is down-sampled to acquire down-sampled image frame data, and the metadata and the down-sampled image frame data are stored. By down-sampling HDR-processed image frame data and storing the metadata and the down-sampled image frame data, the occupied storage space can be reduced.

In another embodiment of the present disclosure, for each image frame, the HDR-processed image frame data, corresponding to the video stream element data and acquired in the m-th iteration, may be compressed to acquire compressed HDR-processed image frame data, and the metadata and the compressed HDR-processed image frame data are stored. By compressing HDR-processed image frame data in video image compression scheme and storing the compressed HDR-processed image frame data, storage space is saved.

In the embodiment of the present disclosure, the HDR-processed image frame data, corresponding to the video stream element data and acquired in the m-th iteration, may be compressed in various video compression schemes. For example, the HDR-processed image frame data may be compressed with H.264 encoder. The compressed HDR-processed image frame data may be referred to as HDR-processed video ES data.

It can be understood that the HDR-processed image frame data may be reduced in other manners, as long as a storage space occupied by the reduced image frame data is smaller than a storage space occupied by the image frame data before being reduced. The other manners are not detailed herein.

Further, the compressed HDR-processed image frame data or the down-sampled image frame data may be packaged into an HDR-processed video file, and the HDR-processed video file is played and displayed on the target display panel.

In an embodiment, the compressed HDR-processed image frame data or the down-sampled image frame data may be packaged into the HDR-processed video file by using FFMPFG tooling. It can be understood that the compressed HDR-processed image frame data or the down-sampled image frame data may be packaged into the HDR-processed video file by using other video packaging tools.

In an embodiment, the effect of processing the HDR video may be completely and continuously viewed via a video stream viewer.

It can be understood that in practices, the display processing for the HDR video may be optimized by using multiple HDR test videos. Once one of the HDR test videos passes the test, a next HDR test video is tested. Alternatively, all the HDR test videos are tested, and the display processing for the HDR video is optimized by comprehensively considering playback results of all the HDR test videos.

Figure 2:
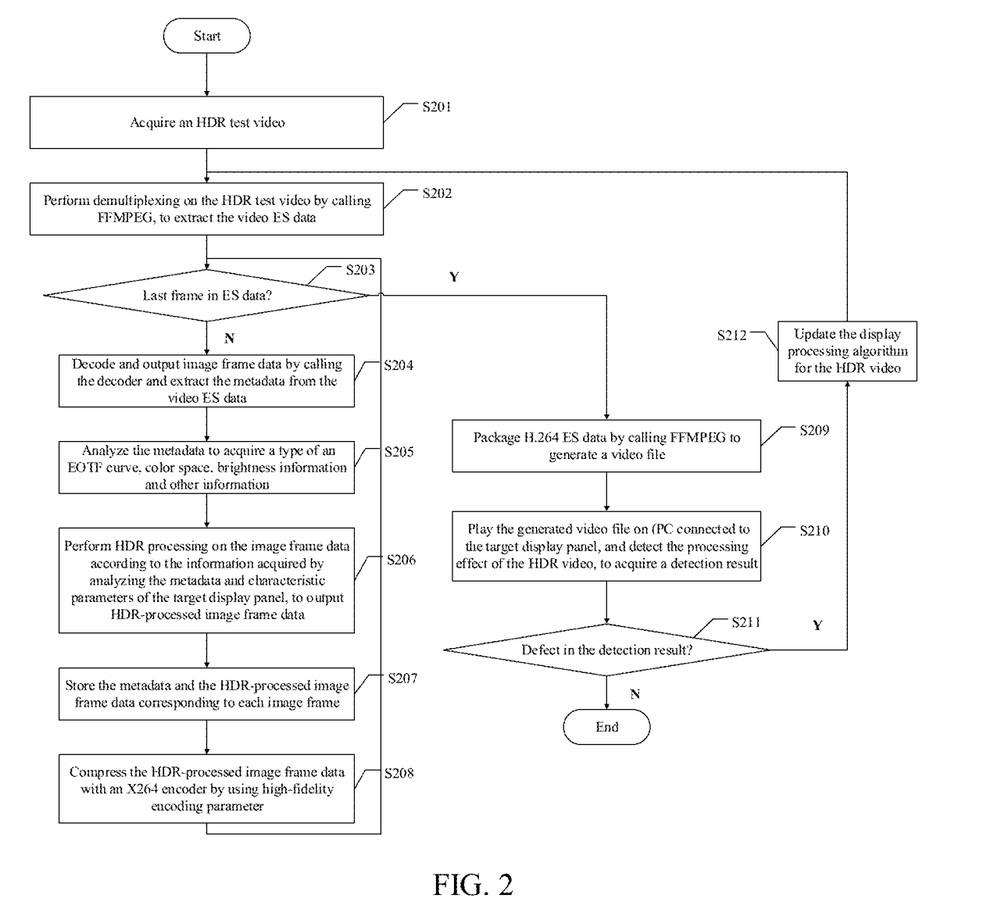
FIG. 2 shows a flow chart of a method for optimizing display processing of an HDR video according to another embodiment of the present disclosure.

Reference is made to FIG. 2, which is a flow chart of a method for optimizing display processing of an HDR video according to another embodiment of the present disclosure. The method includes the following S201 to S212.

In S201, a HDR test video is acquired.

In S202, demultiplexing is performed on the HDR test video by calling FFMPEG tooling, to extract the video ES data.

The demultiplexing is to extract different audio streams and video streams from an audio and video signal source. Demultiplexing is performed on the HDR test video to extract a video ES and an audio ES.

S201 and S202 are optional. In some alternative embodiments, the video ES data may be acquired from an HDMI-input stream or acquired from pre-stored video ES data.

In S203, it is determined whether HDR processing is completed for the last frame of video ES data.

In a case that it is determined that HDR processing is not completed for the last frame of video ES data, S204 is performed. In a case that it is determined that HDR processing is completed for the last frame of video ES data, S209 is performed.

In S204, the image frame data is decoded and outputted by calling the decoder and the metadata is extracted from the video ES data.

Each image frame is decoded by using an HEVC 10 bit decoder, a VP9 10 bit decoder or other decoders, to output image frame data of each image frame. It can be understood that the image frame may be decoded by using other types of decoders.

In S205, the metadata is analyzed to acquire the type of the EOTF curve, gamut, brightness information and other information.

In an embodiment, due to different standards of the HDR test video, the metadata may further include the curve parameter of tone mapping.

In S206, HDR processing is performed on the HDR image data according to the information acquired by analyzing the metadata and characteristic parameters of the target display panel, to output the HDR-processed image frame data.

In S207, the metadata and the HDR-processed image frame data corresponding to each image frame are stored.

In S208, the HDR-processed image frame data is compressed with an X264 encoder by using high-fidelity encoding parameter.

The HDR-processed image frame data is compressed with the X264 encoder to acquire H.264 ES data.

In some alternative embodiments, the HDR-processed image frame data corresponding to each image frame may be down-sampled to acquire the down-sampled image frame data, and the metadata and the down-sampled image frame data are stored.

It can be understood that the HDR-processed image frame data is compressed or down-sampled to reduce the storage space. In practices, the HDR-processed image frame data may be reduced in other manners, as long as the storage space occupied by the reduced image frame data is smaller than the storage space occupied by the image frame data before being reduced.

After S208 is performed, S203 is performed to determine whether the HDR processing is completed for the last image frame of video ES data. After HDR processing is completed for the last image frame of video ES data, S209 is performed.

In S209, the H.264 ES data is packaged by calling FFMPEG tooling to generate a video file.

In some alternative embodiments, S209 may be omitted, and the processing effect of the HDR video may be viewed completely and continuously through a stream viewer.

In S210, the generated video file is played on a personal computer (PC) connected to the target display panel, and the processing effect of the HDR video is detected, to acquire a detection result.

In S211, it is determined whether there is a defect in the detection result.

In a case that there is a defect in the detection result, S212 is performed. In a case that there is no defect in the detection result, the procedure is stopped, thus completing the optimization of the display processing of the HDR video.

In S212, the display processing algorithm for the HDR video is updated.

After step S212, the updated display processing algorithm for the HDR video serves as the display processing algorithm for the HDR video for a next iteration and S202 is performed, to enter the next iteration of the display processing algorithm for the HDR video.

In order to facilitate those skilled in the art to better understand and implement the embodiments of the present disclosure, a device for optimizing display processing of an HDR video is further provided according to an embodiment of the present disclosure.

Figure 3:
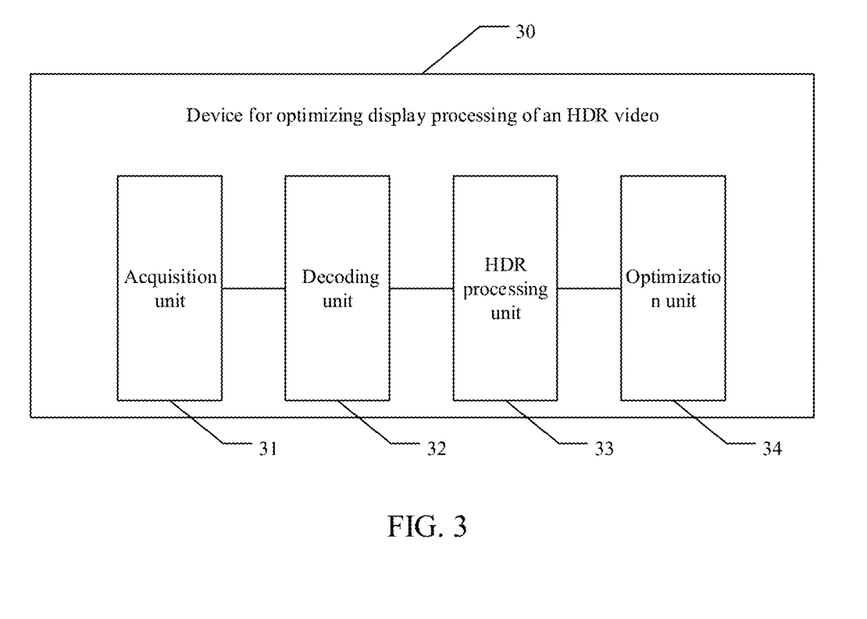
FIG. 3 shows a schematic structural diagram of a device for optimizing display processing of an HDR video according to an embodiment of the present disclosure.

Reference is made to FIG. 3, which is a schematic structural diagram of a device for optimizing display processing of an HDR video according to an embodiment of the present disclosure. The device 30 for optimizing display processing of an HDR video may include an acquisition unit 31, a decoder 32, a HDR processing unit 33, and an optimization unit 34.

The acquisition unit 31 is configured to acquire video element stream data.

The decoding unit 32 is configured to decode the video element stream data to acquire metadata and image frame data of each image frame, where the metadata includes gamut information and brightness information.

The HDR processing unit 33 is configured to perform, in an m-th iteration of display processing of the HDR video, HDR processing on image frame data of each image frame with a display processing algorithm for the HDR video according to characteristic parameters of a target display panel and the metadata, to acquire HDR-processed image frame data in the m-th iteration, where the HDR-processed image frame data corresponds to the video element stream data.

The optimization unit 34 is configured to optimize a display processing algorithm for the HDR video for usage in an (m+1)-th iteration based on a playback result of the HDR-processed image frame data, corresponding to the video element stream data and acquired in the m-th iteration, on the target display panel; and complete optimization of the display processing algorithm for the HDR video in the HDR processing once the playback result of the HDR-processed image frame data, corresponding to the video element stream data and acquired in an (m+i)-th iteration, on the target display panel meets a predetermined condition, where $m \geq 1$, $i \geq 0$, and m and i each represent an integer.

In an embodiment, the operation principle and flow of the device 30 for optimizing display processing of an HDR video may be referred to the description of the method for optimizing display processing of an HDR video according to any one of the above embodiments of the present disclosure, which are not repeated herein.

In specific implementations, the device 30 for optimizing display processing of an HDR video may correspond to: a terminal (or referred to as user equipment) or a chip with the function of optimizing display processing for the HDR video; a chip with a data processing function, such as a baseband chip; a chip module including the chip with the function of optimizing display processing of the HDR video in the user equipment; a chip module including a chip with the data processing function; or the user equipment.

In specific implementations, modules/units included in the apparatuses and the products described in the above embodiments may be software modules/units, hardware modules/units, or partly software modules/units and partly hardware modules/units.

For example, for the apparatuses or products applied to or integrated in a chip, modules/units included therein may be implemented by hardware such as circuits. Alternatively, at least some of the modules/units may be implemented by a software program executed on a processor integrated inside the chip, and the remaining part (if any) of the modules/units may be implemented by hardware such as circuits. For the apparatuses or products applied to or integrated in a chip module, modules/units included therein may be implemented by hardware such as circuits, and different modules/units may reside in a same component (such as a chip or a circuit module) or different components of the chip module. Alternatively, at least some of the modules/units may be implemented by software programs executed on a processor integrated inside the chip module, and the remaining part (if any) of the modules/units may be implemented by hardware such as circuits. For the apparatus or products applied to or integrated in a terminal, modules/units included therein may be implemented by hardware such as circuits, and different modules/units may reside in a same component (such as a chip or a circuit module) or different components of the terminal. Alternatively, at least some of the modules/units may be implemented by software programs executed on a processor integrated inside the terminal, and the remaining part (if any) of the modules/units may be implemented by hardware such as circuits.

A non-transitory storage medium is further provided according to an embodiment of the present disclosure. The non-transitory storage medium stores a computer program. The computer program, when being executed by a processor, performs the method for optimizing display processing of an HDR video according to any one of the above embodiments.

A terminal is further provided according to an embodiment of the present disclosure. The terminal includes a memory and a processor. The memory stores a computer program executable by the processor. The processor is configured to, when executing the computer program, perform the method for optimizing display processing of an HDR video according to any one of the above embodiments.

Those skilled in the art may understand that all or some of the steps of the method in the embodiments may be implemented by relevant hardware instructed by a program. The program may be stored in a computer readable storage medium. The storage medium may include: a ROM, a RAM, a magnetic disk, an optical disc or the like.

Although the present disclosure is disclosed as above, the present disclosure is not limited thereto. Those skilled in the art may make various changes and modifications without departing from the spirit and scope of the present disclosure. Therefore, the protection scope of the present disclosure is defined by the claims.

The invention claimed is:

1. A method for optimizing display processing of an HDR video, comprising:
   acquiring video element stream data;
   decoding the video element stream data to acquire image frame data of each image frame and metadata, wherein the metadata comprises gamut information and brightness information;
   in an m-th iteration of display processing of the HDR video, performing HDR processing on image frame data of each image frame with a display processing algorithm for the HDR video according to a characteristic parameter of a target display panel and the metadata, to acquire HDR-processed image frame data in the m-th iteration; and optimizing the display processing algorithm for the HDR video for usage in an (m+1)-th iteration based on a playback result of the HDR-processed image frame data, acquired in the m-th iteration, on the target display panel; and completing optimization of the display processing algorithm for the HDR video in the HDR processing once the playback result of the HDR-processed image frame data, acquired in an (m+i)-th iteration, on the target display panel meets a predetermined condition, wherein m≥1, i≥0, and m and i each represent an integer.

2. The method for optimizing display processing of an HDR video according to claim 1, wherein the performing HDR processing on image frame data of each image frame with a display processing algorithm for the HDR video according to a characteristic parameter of a target display panel and the metadata, to acquire HDR-processed image frame data in the m-th iteration comprises:

performing the HDR processing on an n-th image frame in the video element stream data by:
modifying a brightness of image frame data of the n-th image frame according to the characteristic parameter of the target display panel and brightness information of the n-th image frame; and
performing gamut mapping on the image frame data of the n-th image frame according to the characteristic parameter of the target display panel and gamut information of the n-th image frame,
where 0<n≤N, N represents total number of image frames in the video element stream data, and n and N each represent a positive integer.

3. The method for optimizing display processing of an HDR video according to claim 2, wherein the metadata further comprises a curve parameter of tone mapping.

4. The method for optimizing display processing of an HDR video according to claim 3, wherein the performing the HDR processing on the image frame data of the n-th image frame comprises:
performing tone mapping on the image frame data of the n-th image frame according to the characteristic parameter of the target display panel and the curve parameter of the tone mapping of the n-th image frame.

5. The method for optimizing display processing of an HDR video according to claim 1, further comprising:
storing the HDR-processed image frame data acquired in the m-th iteration, and the metadata.

6. The method for optimizing display processing of an HDR video according to claim 5, wherein the storing the HDR-processed image frame data acquired in the m-th iteration, and the metadata, comprises any one of:
compressing the HDR-processed image frame data of each image frame acquired in the m-th iteration, to acquire compressed HDR-processed image frame data, and storing the metadata and the compressed HDR-processed image frame data; and
down-sampling the HDR-processed image frame data of each image frame acquired in the m-th iteration, to acquire down-sampled image frame data, and storing the metadata and the down-sampled image frame data.

7. The method for optimizing display processing of an HDR video according to claim 5, wherein the optimizing the display processing algorithm for the HDR video for usage in an (m+1)-th iteration based on a playback result of the HDR-processed image frame data, acquired in the m-th iteration, on the target display panel comprises:
in a case that there is a defect in the playback result of the HDR-processed image frame data, acquired in the m-th iteration, on the target display panel, optimizing the display processing algorithm for the HDR video for usage in the (m+1)-th iteration according to the defect, the metadata and the HDR-processed image frame data, acquired in the m-th iteration, wherein the defect comprises at least one of: an inter-frame brightness flicker, a local overexposure of image, undersaturation of image, and oversaturation of image.

8. A non-transitory storage medium, storing a computer program, wherein
the computer program, when being executed by a processor, implements:
acquiring video element stream data;
decoding the video element stream data to acquire image frame data of each image frame and metadata, wherein the metadata comprises gamut information and brightness information;
in an m-th iteration of display processing of the HDR video, performing HDR processing on image frame data of each image frame with a display processing algorithm for the HDR video according to a characteristic parameter of a target display panel and the metadata, to acquire HDR-processed image frame data in the m-th iteration; and
optimizing the display processing algorithm for the HDR video for usage in an (m+1)-th iteration based on a playback result of the HDR-processed image frame data, acquired in the m-th iteration, on the target display panel; and completing optimization of the display processing algorithm for the HDR video in the HDR processing once the playback result of the HDR-processed image frame data, acquired in an (m+i)-th iteration, on the target display panel meets a predetermined condition, wherein m≥1, i≥0, and m and i each represent an integer.

9. A terminal comprising a memory and a processor, wherein
the memory is configured to store a computer program executable by the processor; and
the processor is configured to, when executing the computer program:
acquire video element stream data;
decode the video element stream data to acquire image frame data of each image frame and metadata, wherein the metadata comprises gamut information and brightness information;
in an m-th iteration of display processing of the HDR video, perform HDR processing on image frame data of each image frame with a display processing algorithm for the HDR video according to a characteristic parameter of a target display panel and the metadata, to acquire HDR-processed image frame data in the m-th iteration; and
optimize the display processing algorithm for the HDR video for usage in an (m+1)-th iteration based on a playback result of the HDR-processed image frame data, acquired in the m-th iteration, on the target display panel; and complete optimization of the display processing algorithm for the HDR video in the HDR processing once the playback result of the HDR-processed image frame data, acquired in an (m+i)-th iteration, on the target display panel meets a predetermined condition, wherein m≥1, i≥0, and m and i each represent an integer.

10. The device according to claim 9, wherein the processor is further configured to:
perform the HDR processing on an n-th image frame in the video element stream data by:
modifying a brightness of image frame data of the n-th image frame according to the characteristic parameter of the target display panel and brightness information of the n-th image frame; and
performing gamut mapping on the image frame data of the n-th image frame according to the characteristic parameter of the target display panel and gamut information of the n-th image frame,
where 0<n≤N, N represents total number of image frames in the video element stream data, and n and N each represent a positive integer.

11. The device according to claim 10, wherein the metadata further comprises a curve parameter of tone mapping.

12. The device according to claim 11, wherein the processor is further configured to:
perform tone mapping on the image frame data of the n-th image frame according to the characteristic parameter of the target display panel and the curve parameter of the tone mapping of the n-th image frame.

13. The device according to claim 9, wherein the processor is further configured to:
store the HDR-processed image frame data acquired in the m-th iteration, and the metadata.

14. The device according to claim 13, wherein the processor is further configured to:
compress the HDR-processed image frame data of each image frame acquired in the m-th iteration, to acquire compressed HDR-processed image frame data, and store the metadata and the compressed HDR-processed image frame data; or
down-sample the HDR-processed image frame data of each image frame acquired in the m-th iteration, to acquire down-sampled image frame data, and store the metadata and the down-sampled image frame data.

15. The device according to claim 13, wherein the processor is further configured to:
in a case that there is a defect in the playback result of the HDR-processed image frame data, acquired in the m-th iteration, on the target display panel, optimize the display processing algorithm for the HDR video for usage in the (m+1)-th iteration according to the defect, the metadata and the HDR-processed image frame data, acquired in the m-th iteration, wherein the defect comprises at least one of: an inter-frame brightness flicker, a local overexposure of image, undersaturation of image, and oversaturation of image.

16. The storage medium according to claim 8, wherein the computer program further causes the processor to:
perform the HDR processing on an n-th image frame in the video element stream data by:
modifying a brightness of image frame data of the n-th image frame according to the characteristic parameter of the target display panel and brightness information of the n-th image frame; and
performing gamut mapping on the image frame data of the n-th image frame according to the characteristic parameter of the target display panel and gamut information of the n-th image frame,
where 0<n≤N, N represents total number of image frames in the video element stream data, and n and N each represent a positive integer.

17. The storage medium according to claim 16, wherein the metadata further comprises a curve parameter of tone mapping.

18. The storage medium according to claim 17, wherein the computer program further causes the processor to:
perform tone mapping on the image frame data of the n-th image frame according to the characteristic parameter of the target display panel and the curve parameter of the tone mapping of the n-th image frame.

19. The storage medium according to claim 8, wherein the computer program further causes the processor to:
store the HDR-processed image frame data acquired in the m-th iteration, and the metadata.

20. The storage medium according to claim 19, wherein the computer program further causes the processor to:
compress the HDR-processed image frame data of each image frame acquired in the m-th iteration, to acquire compressed HDR-processed image frame data, and store the metadata and the compressed HDR-processed image frame data; or
down-sample the HDR-processed image frame data of each image frame acquired in the m-th iteration, to acquire down-sampled image frame data, and store the metadata and the down-sampled image frame data.

* * * * *